United States Patent [19]

Kondo

[11] 4,119,978
[45] Oct. 10, 1978

[54] PHOTOGRAPHIC CAMERA WITH AUTOMATIC EXPOSURE CONTROL

[75] Inventor: Toshihiro Kondo, 2-14-3, Kamiishihara, Chofu-shi, Tokyo, Japan

[73] Assignees: Toshihiro Kondo, Chofu; Fuji Photo Film Co., Ltd., Minamiashigara, both of Japan

[21] Appl. No.: 725,333

[22] Filed: Sep. 21, 1976

[30] Foreign Application Priority Data

Sep. 25, 1975 [JP] Japan ................................ 50-115781

[51] Int. Cl.² ........................................... G03B 7/08
[52] U.S. Cl. ...................................... 354/38; 354/29
[58] Field of Search ...................... 354/26, 28, 29, 30, 354/36, 37, 38

[56] References Cited

U.S. PATENT DOCUMENTS

| | | | |
|---|---|---|---|
| 3,721,167 | 3/1973 | Ogiso | 354/38 X |
| 3,972,055 | 7/1976 | Matsuda et al. | 354/29 X |
| 4,045,807 | 8/1977 | Ito et al. | 354/38 |

Primary Examiner—Michael L. Gellner
Attorney, Agent, or Firm—Gerald J. Ferguson, Jr.; Joseph J. Baker

[57] ABSTRACT

A photographic camera permits automatic exposure control wherein either the diaphragm aperture setting or the shutter speed setting is preselected while the other is automatically obtained thereafter. Arithmetical operations are electronically performed on various exposure control parameters such as the scene brightness etc., and signals resulting from these operations are used to control the shutter control mechanism or the aperture control mechanism to automatically obtain the shutter speed or diaphragm aperture required for proper exposure.

9 Claims, 5 Drawing Figures

PHOTOGRAPHIC CAMERA WITH AUTOMATIC EXPOSURE CONTROL

BACKGROUND OF THE INVENTION

1. Field of the Invention

This invention relates to a photographic camera with automatic exposure control, more particularly to a camera with automatic exposure control wherein either the diaphragm aperture or the shutter speed is preset while the other is automatically set thereafter so that appropriate exposure can obtained automatically.

2. Description of the Prior Art

There are known two types of automatic exposure control in a camera, i.e., the shutter speed presetting type in which the shutter speed setting is preselected and the diaphragm aperture is automatically set thereafter, and the diaphragm aperture presetting type in which the diaphragm aperture setting is preselected and the shutter speed is automatically obtained thereafter. According to the former type of camera in which the diaphragm aperture is automatically determined, the shutter speed setting can be preselected taking into consideration the movement of the object to be photographed. It is, however, impossible with such a camera to adjust the diaphragm aperture to obtain the desired depth of field. On the other hand, in the latter type of camera in which the shutter speed is automatically set the depth of field can be controlled but it is not possible to take into account the movement of the object to be photographed. Thus, each of the two types of cameras has its merits and demerits. It is therefore desirable for the photographer to be able to choose the type of exposure control which best meets the existing conditions of scene brightness and object behavior. In order to make this choice possible, there have been proposed a number of automatic exposure control cameras in which either the shutter speed setting or the diaphragm aperture setting can be preselected according to the circumstances in which photograph is to be taken. However, these conventional cameras have the disadvantage that they are very complicated both in circuitry and in mechanism since they are required to provide switch-over between two entirely different modes of operation, one in which the shutter speed is automatically controlled and the other in which the diaphragm aperture is automatically controlled.

SUMMARY OF THE INVENTION

In view of the problems inherent in prior art, one object of the present invention is accordingly to provide a photographic camera with automatic exposure control which is of very simple construction but which permits either of two exposure parameters, namely, the shutter speed or the diaphragm aperture, to be preset and then automatically determines the other parameter in relation to the preset one. More specifically, the invention is characterized by the fact that arithmetical operations (addition and subtraction) are performed on indices of such various exposure parameters as the scene brightness, film speed, shutter speed, diaphragm aperture, etc., and the signals resulting from these operations are used to control the shutter control mechanism or the diaphragm control mechanism to automatically obtain the shutter speed or diaphragm required for proper exposure. In other words, both the shutter speed and diaphragm aperture are controlled by time signals which, when short, provide shorter shutter speed or smaller diaphragm aperture at higher light levels. There is known a so-called APEX system (Additive Photographic Exposure System) in accordance with which addition and substraction operations are performed on indices of various exposure control parameters and the relationship between the parameter indices can be expressed in terms of the equation given below:

$$BV + SV = TV + AV \quad (1)$$

where $BV$ is an index representing the scene brightness, $SV$ an index representing the speed of film loaded in the camera, $AV$ an index representing the diaphragm aperture and $TV$ an index representing the shutter speed. The above equation (1) may be varied as follows:

$$AV = BV + SV - TV \quad (2)$$

$$TV = BV + SV - AV \quad (3)$$

As can be seen from the equations (2) and (3), if either the diaphragm aperture index $AV$ or the shutter speed index $TV$ is determined the other is also determined since the remaining parameters are fixed at the time the film is to be exposed.

This invention takes advantage of the fact that shutter control is effected in terms of time and uses the time signal for controlling the shutter speed to control the diaphragm aperture as well, and by using the same time signal to control whichever of the shutter speed and the diaphragm aperture that is to be automatically controlled it becomes possible to automatically control both the shutter speed and the diaphragm aperture by means of one and the same circuit so that a simply constructed control means can be used. The shutter control mechanism used in this invention employs the conventional electronic shutter controlled by time signals to provide desired shutter speeds. The diaphragm aperture control mechanism is also controlled by the same time signals in which case they are used to control the rotation of the diaphragm drive ring. More specifically, the time signals are used to control the rotation of a stopper member to a given angle or position and the diaphragm drive ring is then rotated until a toothed cam thereon strikes against the stopper member to stop the drive ring at the position where the diaphragm blades define an aperture of appropriate diameter.

BRIEF DESCRIPTION OF THE DRAWINGS

The objects, features and advantages of the invention will be apparent from the subsequent description of a specific embodiment, the appended claims and the accompanying drawings, in which:

DESCRIPTION OF THE PREFERRED EMBODIMENTS

Figure 1:
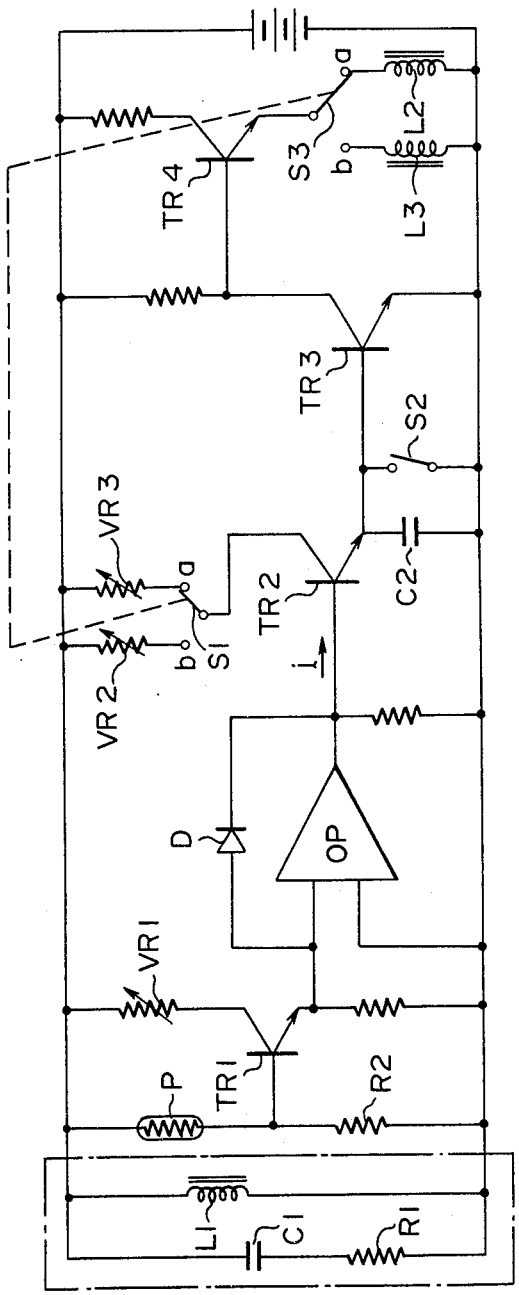
FIG. 1 is a circuit diagram illustrating a time control circuit in accordance with the invention.

The present invention will be described in more detail with reference to the accompanying drawings. FIG. 1 is a circuit diagram showing an example of a time control circuit according to this invention. As shown in FIG. 1, a coil $L_1$ is provided for driving a leading shutter curtain of a focal-plane shutter across the film when a current is passed through the coil $L_1$. Alternatively, the coil $L_1$ may be a bobbin coil slidably fitted around a permanent magnet, and the diaphragm drive ring may be connected to the bobbin coil so as to be electrically driven by the coil $L_1$ when a current is passed therethrough. In parallel with the coil $L_1$ is connected a time delay circuit consisting of a capacitor $C_1$ and a resistor $R_1$ in series connection. In a single-lens reflex camera, the time delay circuit functions so that the coil $L_1$ will be energized with a time delay corresponding to the interval between the instant that a switch (not shown) closes upon depression of the shutter release button and the time when the mirror has completely swung upward. A photoconductive element P is provided at the front of the camera for measuring scene brightness. The resistance of the photoconductive element P varies with the intensity of the light incident thereon and a voltage develops across the element P or at a point between the element P and a resistor $R_2$ connected in series therewith. This voltage which corresponds to the intensity of the light incident on the element P is applied to the base of a transistor $TR_1$. To the collector of the transistor $TR_1$ is connected a variable resistor $VR_1$ which is linked to the ASA dial and is used to introduce information regarding the speed of the film loaded in the camera into the time control circuit. Thus, film-speed information provided by the resistor $VR_1$ and scene brightness information from the element P are brought to bear on the transistor $TR_1$ which produces a collector voltage output which represents the exposure information. The collector voltage of the transistor $TR_1$ is applied to an operational amplifier OP which provides an amplified voltage output. Output current $i$ of the operational amplifier OP, which is also log-compressed by a log diode D, flows into the base of a transistor $TR_2$. To the collector of the transistor $TR_2$ is connected a variable resistor $VR_2$ for introducing diaphragm setting information and a variable resistor $VR_3$ for introducing shutter speed setting information. Switch $S_1$ is provided to selectively connect either the resistor $VR_2$ or the resistor $VR_3$ to the transistor $TR_2$. The resistor $VR_2$ is switched into the circuit when the diaphragm aperture is to be preset and its resistance is varied in accordance with the rotation of the diaphragm ring as in the conventional full-aperture light measuring system. The variable resistor $VR_3$ is switched into the circuit when the shutter speed is to be preselected and its resistance varies in accordance with the shutter speed dial setting. The collector current of the transistor $TR_2$ is controlled in accordance with the output current $i$ of the operational amplifier OP and by the variable resistor $VR_2$ or the variable resistor $VR_3$. The collector current of the transistor $TR_2$ causes a trigger switch $S_2$ to open, charging a timing capacitor $C_2$. Opening of the trigger switch $S_2$ is associated with the swinging up of the mirror when the shutter speed setting is preselected, and is also associated with the traveling of the leading shutter curtain when the diaphragm aperture setting is preselected. After the timing capacitor $C_2$ has been charged, the transistor $TR_3$ begins conducting while a transistor $TR_4$ turns off. The shutter speed or the diaphragm aperture, depending on the mode of control selected, is controlled according to the period of time during which the transistor $TR_4$ conducts. To the emitter of the transistor $TR_4$ is connected a selector switch $S_3$ which is ganged with the switch $S_1$ so that the former opens and closes with the latter. When the switch $S_3$ makes contact with a contact $a$, the coil $L_2$ is operated and the shutter speed setting is thus preselected. When the switch $S_3$ makes connection with a contact $b$, a shutter actuating coil (an electromagnet $L_3$) which magnetically attracts the trailing shutter curtain and holds it in position is operated. This is the switch position chosen when the diaphragm aperture is to be preselected.

The operation of the time control circuit illustrated above is now described for two cases, i.e., the case of diaphragm aperture setting preselection and that of shutter speed setting preselection.

(1) Diaphragm aperture setting preselection

Selector switches $S_1$ and $S_3$ are first switched to their respective contacts $b$, $b$, and the diaphragm ring is then rotated to the desired aperture setting. The variable resistor $VR_2$ is adjusted in the value of its resistance in accordance with the setting selected for the diaphragm ring. Depressing the shutter release button in this state causes the power supply switch (not shown) to close, turning the transistor $TR_4$ on and thus energizing the shutter control coil or electromagnet $L_3$ and cause it to attract the second curtain and hold it in position. The capacitor $C_1$ also begins to charge with the closing of the power switch. While the capacitor $C_1$ is charging, the diaphragm is adjusted to the preselected aperture size and the mirror is retracted from the optical path. When the capacitor $C_1$ has completely charged, current begins to flow through the coil $L_1$ causing the leading curtain to travel across the film and causing the trigger switch $S_2$ to open. Since the resistance of the photoconductive element P varies with the amount of light incident on the element P, the base current which flows into the base of the transistor $TR_1$ is proportional to the scene brightness. On the other hand, the variable resistor $VR_1$ is connected to the collector of the transistor $TR_1$. Accordingly, the voltage developed at the emitter of the transistor $TR_1$ varies with the scene brightness and the film-speed setting of the ASA dial linked with the resistor $VR_1$. The output of transistor $TR_1$ is applied to the operational amplifier OP. The scene brightness information and film-speed information are log-compressed by the amplifier OP and diode D, and the resulting output current is applied to the base of the transistor $TR_2$. As the variable resistor $VR_2$ linked to the diaphragm ring is selectively connected to the transistor $TR_2$, the preselected aperture setting information is fed to the collector together with the two values earlier mentioned. The transistor $TR_2$ therefore has an emitter current which corresponds to three kinds of exposure control information: the scene brightness, the film-speed setting and the preselected diaphragm aperture setting. The emitter current flows into and charges the capacitor $C_2$. When the capacitor $C_2$ has been charged, the transistor $TR_3$ turns on and the transistor $TR_4$ turns off so that the shutter actuating coil (electromagnet) $L_3$ cuts off, allowing the trailing shutter curtain to travel and close the shutter as in the known electronic shutter mechanism.

(2) Shutter speed preselection

The selector switches $S_1$ and $S_3$ are placed in their respective positions $a, a$. In the case where the shutter speed setting is preselected, the setting information is introduced into the time control circuit by means of the variable resistor $VR_3$. A current which corresponds to the shutter speed setting flows through the diaphragm control coil $L_2$, energizing the coil $L_2$ for a fixed period of time. The diaphragm aperture is automatically set in accordance with the length of this period of time by a diaphragm control mechanism which will be described hereinafter.

According to the present invention, the value of the index AV determined from the equation (2) given above is obtained in terms of a time signal which is used to control the shutter speed. For example, when the time signal represents the shutter speed of 1/30 sec., the diaphragm control mechanism is actuated by this signal to automatically set the diaphragm aperture to $f$-number "5.6" in accordance with the table below. Similarly, when the time signal represents the shutter speed of 1/250 sec., the diaphragm aperture is automatically set to $f$-number "16". Thus in this mode of operation the shutter speed setting can be preselected, and the diaphragm aperture setting is automatically determined thereafter.

Table

| TV (time index) AV (aperture index) SV (film-speed index) | 0 | 1 | 2 | 3 | 4 | 5 | 6 | 7 | 8 | 9 | 10 |
|---|---|---|---|---|---|---|---|---|---|---|---|
| T (shutter speed/sec) | 1 | 1/2 | 1/4 | 1/8 | 1/16 | 1/30 | 1/60 | 1/125 | 1/250 | 1/500 | 1/1000 |
| A (aperture value/ f number) | 1 | 1.4 | 1.8 | 2.8 | 4 | 5.6 | 8 | 11 | 16 | 22 | 32 |
| S (film-speed/ASA) | | | | 25 | 50 | 100 | 200 | 400 | 800 | 1600 | 3200 |

In the through-the lens (TTL) light measuring system, it is absolutely essential that the appropriate diaphragm aperture should automatically be set during the interval between the instant that the mirror begins to swing upward out of the optical path and the time when the shutter begins to open, and for this reason a time signal of 1/30 second or longer is too long and impractical. It is also almost impossible from a mechanical point of view to set the diaphragm blades to the appropriate aperture size within such a short time as 1/2000 second. In the light of this, it is preferable to take the time signal of 1/125 second as a reference signal and to compress the time signals of 4 to 1/125 second to about 1/30 to 1/125 second and to expand the time signals of 1/125 to 1/2000 second to about 1/125 to 1/500 second.

Figure 2:
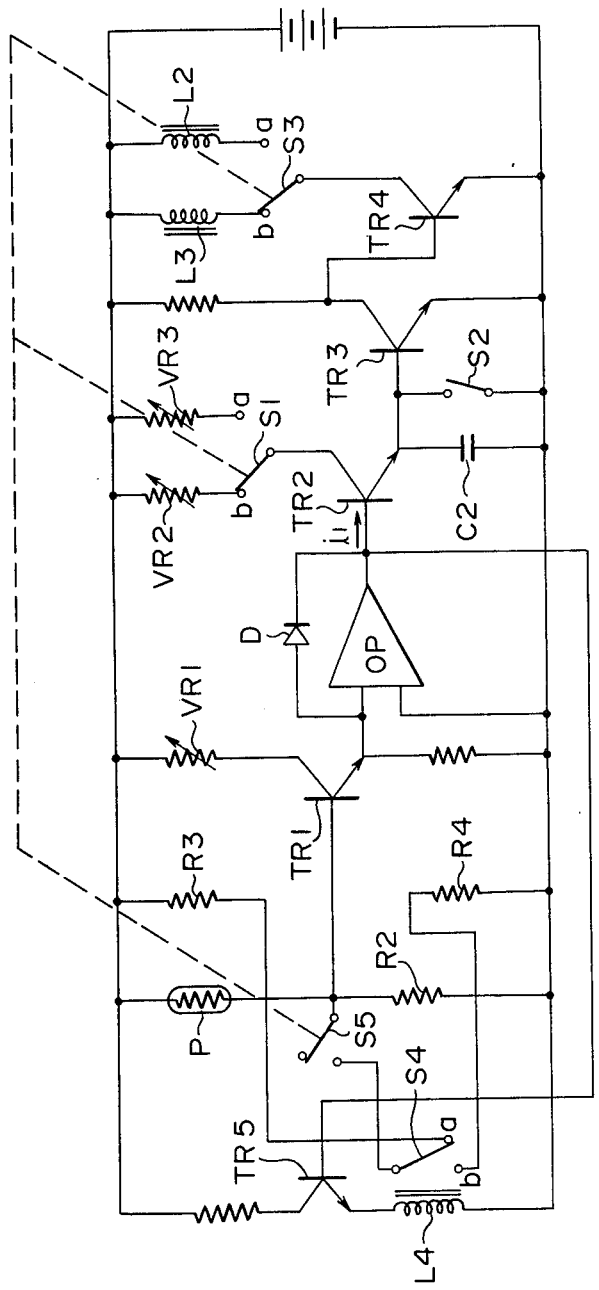
FIG. 2 is a circuit diagram illustrating a modified form of the circuit shown in FIG. 1 including a conversion circuit.

FIG. 2 indicates a modified form of the circuit of FIG. 1 including a conversion circuit which compresses or expands the time signals produced when the shutter speed setting is preselected. In this modified circuit, (the base of a transistor $TR_5$) is connected to the output of the operational amplifier OP of the type shown in FIG. 1 and the output current of the operational amplifier OP is fed to the base of the transistor $TR_5$, causing the transistor $TR_5$ to conduct if the sensed scene brightness is above a predetermined value. The conducting transistor $TR_5$ causes a current to flow into a relay $L_4$ in series with the transistor $TR_5$, causing a relay switch $S_4$ to open a circuit including the contact $a$ and thus to close a circuit including the contact $b$. A resistor $R_3$ is connected in series with the contact $a$ of the relay switch $S_4$ while a resistor $R_4$ is connected in series with the contact $b$. Each of the resistors $R_3$ and $R_4$ is in connection with the base of the transistor $TR_1$ through a switch $S_5$ which is ganged with the selector switch $S_1$ to be closed when the shutter speed setting is preselected.

The switch $S_5$ is therefore closed when the desired shutter speed is to be first set and, in this condition, if the sensed light intensity is above the predetermined value, that is to say if the aperture control time signal is greater than 1/125 second, the operational amplifier OP provides an output signal which makes the transistor $TR_5$ conduct, causing the relay $L_4$ to be energized and thus switching the relay switch $S_4$ to position $b$. As shown, the contact $b$ of the relay switch $S_4$ is connected to the resistor $R_4$, and thus the resistor $R_4$ is placed in parallel with the resistor $R_2$, causing a drop in the input voltage to the transistor $TR_1$. Consequently, the timing capacitor $C_2$ receives a decreased amount of charging current, making the time signal last longer and thus causing the aperture control coil $L_2$ to be energized for a longer period. On the other hand, if the light intensity has a value below the predetermined value, that is to say if the time signal is less than 1/125 second, the transistor $TR_5$ does not conduct thus maintaining the relay switch $S_4$ in position $a$.

As shown, the resistor $R_3$ is connected in series with the contact $a$, and is also connected parallel with the photoconductive element P, thus causing the transistor $TR_1$ to have an increased input voltage. Oppositely from the earlier case, therefore, the timing capacitor $C_2$ in this case has an increased charging current, making the time signal shorter.

Figure 3:
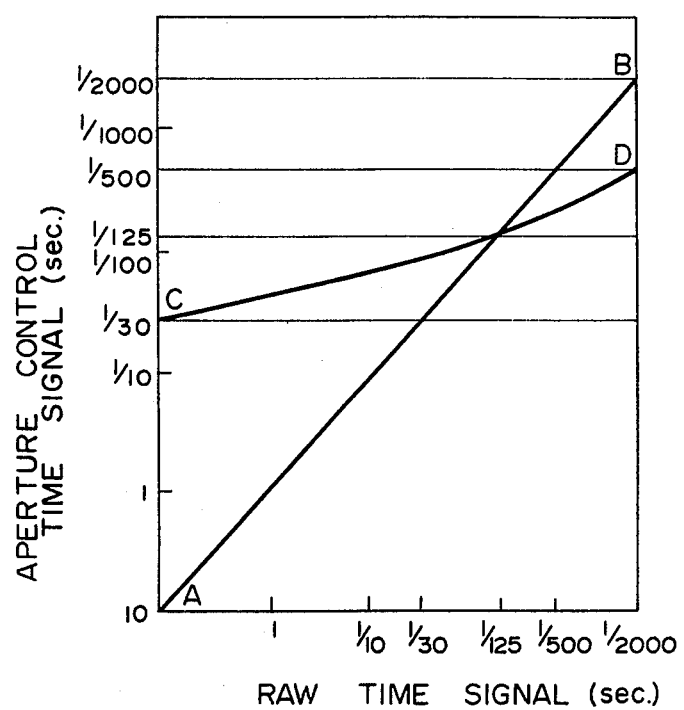
FIG. 3 is a graphic representation of the time signals derived from the circuits of FIGS. 1 and 2 when the shutter speed setting is first preselected.

The result of the above arrangement is shown in FIG. 3. Namely, when the shutter speed is preselected, the relationship between the raw time signals corresponding to the shutter speed of 10 to 1/2000 second and the time signal used to control the aperture setting is changed from that represented by line AB (the case of the circuit shown in FIG. 1 which uses the raw time signals directly as aperture control time signals) to that represented by line CD. When, on the other hand, the aperture value setting is preselected, the switch $S_5$ is in open position, and thus current flows into the shutter actuating coil $L_3$ for a period of time automatically determined by the circuit in the same manner as in the circuit shown in FIG. 1.

In accordance with the circuit shown in FIG. 2, the conversion of the raw time signal to the adjusted time signal for aperture control is accomplished by switching over the input level to transistor $TR_1$ above and below a predetermined intensity of scene brightness. Alternatively, the circuit arrangement may be such that the charging current of the capacitor $C_2$ can be varied directly.

Figure 4:
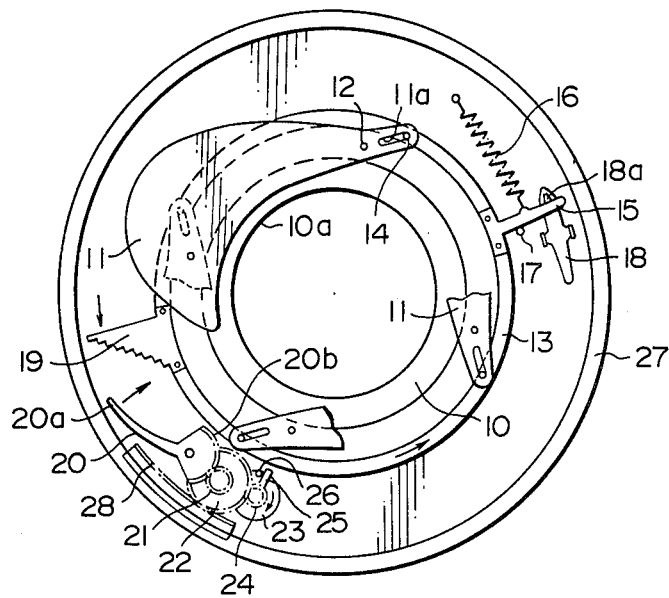
FIG. 4 is a front view illustrating the arrangement of a diaphragm control mechanism according to the invention, in which the blades are opened to allow passage of the maximum amount of light.
Figure 5:
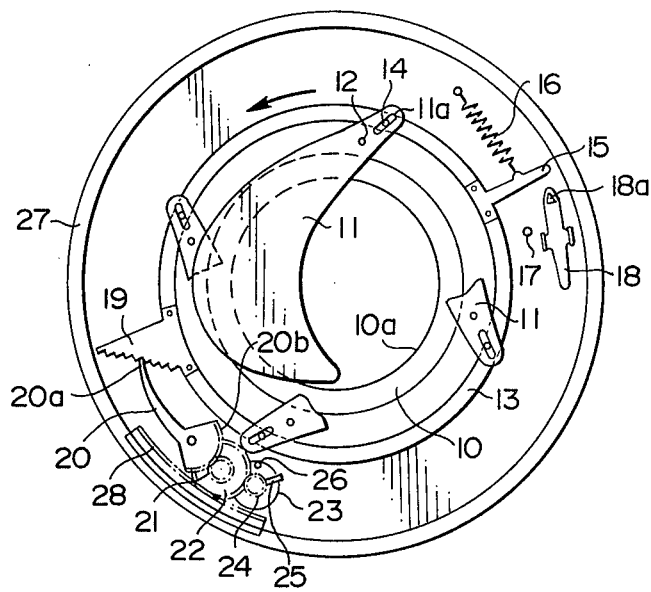
FIG. 5 is a front view of the arrangement shown in FIG. 4, in which the blades are closed to allow passage of a controlled amount of light.

FIGS. 4 and 5 indicate an automatic aperture control mechanism according to the invention which permits both automatic and manual setting of the diaphragm aperture in accordance with time signals. A fixed ring 10 has a central opening 10$a$ through which light is admitted, and has a plurality of diaphragm blades 11 (only one blade shown) each pivotally secured thereto by means of a pin 12. A diaphragm drive ring 13 fits around the fixed ring 10 so that it can rotate in clockwise or counterclockwise direction. The diaphragm drive ring 13 has a pin 14 secured thereto, and the pin 14 passes through a rectangular slot 11a formed at one end of the diaphragm blade 11. Thus, rotation of the diaphragm drive ring 13 causes each diaphragm blade 11 to rotate on its pin 12. The diaphragm drive ring 13 includes a member 15 which extends in radial direction, and is connected to one end of a spring 16. During the film winding operation, the diaphragm drive ring 13 is rotated clockwise until its member 15 comes in contact with a stop pin 17. The spring 16 expands with the rotation of the drive ring 13 and stores force therein while the member 15 is locked and held in position by a pawl 18a of a lock lever 18. This lock lever 18 is in operative connection with the shutter release button, and the lever 18 is pivotally moved at right angles relative to the plane of the drawing at the time of depression of the shutter release button, disengaging the pawl 18a from the member 15. To the drive ring 13 is rigidly secured a cam 19 having a series of teeth formed on the edge thereof, each tooth corresponding a specific aperture setting (f number). Opposite the cam 19 is provided a stop member 20 provided with a pawl 20a at one end thereof, and the pawl 20a of the stop member 20 is engageable with any one of the teeth of the cam 19 so that when the drive ring 13 is moving in counterclockwise direction under the action of the spring 16, it can be stopped by the engagement of the pawl 20a which one of the teeth thereof. Thus, the amount of angular movement of the diaphragm blades 11, that is the size of the aperture, can be controlled by the angle through which the stop member 20 rotates. In other words, if the stop member 20 rotates through a large angle, it enables the drive ring 13 to rotate through a greater angle, resulting in a small aperture size. As shown, the stop member 20 has a sector-like gear 20b at the other end thereof, and the gear 20b engages an intermediate gear 21. The intermediate gear 21 and another intermediate gear 22 are rotatably supported on a common shaft so that the gear 21 can be rotated with the gear 22. The gear 22 is arranged so that it engages a gear 24 of a motor 23. Behind the gear 24 is rigidly secured a stop lever 25, and the stop lever 25 is engageable with a stop pin 26 so that when the motor 23 turns reversely after each shot, it is stopped at the position from which it initially started where the stop lever 25 comes against the stop pin 26. The motor 23 shown in FIGS. 4 and 5 correspond to the aperture control coil $L_2$ in FIGS. 1 and 2, and the amount of rotation of the stop member 20 is determined by the period of time during which current flows through the motor 23, thereby regulating the size of the aperture properly. Therefore, the longer the motor 23 has a flow of current therethrough, the larger becomes the angle through which the stop member 20 is rotated, thus stopping the rotation of drive ring 13 while the aperture size is still large. The intermediate gear 22 is engageable with a toothed member 28 provided inside of a rotatable aperture setting ring 27, and when the aperture setting to be preselected, the position where the stop member 20 and toothed cam 19 are to come into engagement can be determined by rotating the aperture setting ring 27 so that the desired aperture can be manually be set. In this case, rotation of the aperture setting ring 27 causes the variable resistor $VR_2$ for introducing diaphragm aperture information into the control circuit to be adjusted to the proper value.

The operation of the aperture control mechanism described above will now be explained. Assume that the shutter speed has been preselected. Depression of the shutter release button causes the mirror to swing upward and also the trigger switch $S_2$ to open, thus starting the charge of the timing capacitor $C_2$. As was explained earlier, as long as the timing capacitor $C_2$ is charging, the aperture control coil $L_2$ shown in FIGS. 1 and 2 has a current flow therethrough. The coil $L_2$ corresponds to the motor 23 in FIGS. 4 and 5. Thus, as a current flows the motor 23 for a period of time equal to the duration of a time signal determined from the measured light intensity, the film speed setting and the preselected shutter speed setting, the stop member 20 is rotated through the required angular distance by means of the gears 24, 22 and 21. A further depression of the shutter release button causes the lock lever 18 to be pressed down, bringing the pawl 18a and the member 15 out of engagement and thus causing the aperture drive ring 13 to be rotated counterclockwise under the stored force of the spring 16. As the drive ring 13 rotates, the diaphragm blades 11 rapidly rotate on their respective pins 12 in the counterclockwise direction. The drive ring 13 continues to rotate until the toothed cam 19 strikes and is held by the pawl 20a of the stop member 20, and thus the aperture setting is automatically controlled. After the aperture setting has been completed as above, the shutter release button is then depressed further, causing the leading shutter curtain to travel across the film, followed by movement of the trailing shutter curtain after elapse of a predetermined time. Upon closure of the shutter, the stop lever 25 moves back to its initial position where it is stopped by the stop pin 26.

When the aperture setting is preselected, the aperture ring 27 is first rotated to the desired f number, causing the intermediate gear 22 to rotate therewith so that the stop member 20 rotates through the required angle while simultaneously adjusting the variable resistor $VR_2$ in accordance with the preset aperture setting. The aperture setting information is thus introduced into the time control circuit. When the release button is depressed, the aperture drive ring 13 is rotated by the force of spring 16 and the diaphragm blades 11 are closed to the preset aperture size. A further depression of the release button causes the leading shutter curtain to travel, opening the trigger switch $S_2$ associated with the first shutter curtain so that the shutter speed is automatically controlled as in the conventional electronic shutter mechanism referred to earlier.

In accordance with the camera embodying the invention described above, the shutter and diaphragm operations can be controlled by the same time signal, and it is therefore possible to use the conventional electronic shutter mechanism without modification for controlling the diaphragm. As readily understood from the above, therefore, the invention permits automatic exposure control to be accomplished by a system of a very simple construction.

Although the invention has been illustrated by way of a preferred embodiment thereof, it should be understood that various changes and modifications may be made without departing from the spirit and scope of the invention.

I claim:

1. In a photographic camera with automatic exposure control wherein either the shutter speed setting or the diaphragm aperture setting is preselected and the other is automatically controlled thereafter in relation to the preselected setting the improved camera comprising:

time control means for performing arithmetical operations on the indices of exposure control parameters such as scene brightness, film speed, shutter speed and diaphragm aperture, said time control means including capacitive means for producing first and second control signals, the durations of which are functions of said arithmetical operations;

shutter speed setting means for presenting a desired shutter speed;

diaphragm aperture setting means for presetting a desired diaphragm aperture;

first switching means actuable to at least two different positions which permits the shutter speed preset by said shutter speed setting means or the diaphragm aperture preset by said diaphragm aperture setting means to be selectively connected in circuit with said capacitive means so that when (a) said shutter speed setting is selected, the duration of the first control signal is a function of at least said shutter speed setting to the exclusion of said diaphragm aperture setting and (b) said diaphragm aperture setting is selected, the duration of the second control signal is a function of at least said diaphragm aperture setting to the exclusion of said shutter speed setting;

shutter control means responsive to said time control means for automatically controlling the shutter speed in accordance with the duration of said second control signal;

diaphragm aperture control means responsive to said time control means for automatically controlling the diaphragm aperture in accordance with the duration of said first control signal; and selector switching means responsive to said first switching means and actuable to at least two different positions which permits said shutter control means or said aperture control means to be selectively connected to said time control means so that when (a) said shutter speed setting is preselected, the diaphragm aperture is automatically controlled in accordance with the duration of said first control signal and (b) said diaphragm aperture setting is preselected and supplied to said time control means, the shutter speed is automatically controlled in accordance with the duration of said second control signal whereby said first control signal is produced during a first voltage change in a predetermined direction across said capacitive means and said second control signal is produced during a second voltage change in said predetermined direction across said capacitive means.

2. In a camera as in claim 1 where said first and second voltage changes occur during charging of said capacitive means.

3. In a camera as in claim 1 where said time control means includes time signal conversion means for compressing or expanding the duration of said first control signal, said signal conversion means operating only when the shutter speed setting is preselected, whereby said diaphragm aperture control means is automatically controlled in response to the converted first control signal.

4. In a photographic camera with automatic exposure control wherein either the shutter speed setting or the diaphragm aperture setting is preselected and the other is automatically controlled thereafter in relation to the preselected setting the improved camera comprising:

time control means which performs arithmetical operations on the indices of exposure control parameters such as scene brightness, film speed, shutter speed and diaphragm aperture and produces a resulting time signal output;

shutter speed setting means for presetting a desired shutter speed;

diaphragm aperture setting means for presetting a desired diaphragm aperture;

first switching means actuable to at least two different positions which permits the shutter speed preset by said shutter speed setting means or the diaphragm aperture preset by said diaphragm aperture setting means to be selectively supplied to said time control means so that when (a) said shutter speed setting is supplied to said time control means, the duration of time signal output is a function of said shutter speed setting to the exclusion of said diaphragm aperture setting and (b) said diaphragm aperture setting is supplied to said time control means, the duration of said time signal output is a function of said diaphragm aperture setting to the exclusion of said shutter speed setting;

shutter control means operated by said time signal output of said time control means for automatically controlling the shutter speed in accordance with said time signal output;

diaphragm aperture control means operated by said time signal output of said time control means for automatically controlling the diaphragm aperture in accordance with said time signal output; and selector switching means actuable to at least two different positions which permits said shutter control means or said diaphragm aperture control means to be selectively connected to said time control means so that when (a) said shutter speed setting is preselected and supplied to said time control means, the diaphragm aperture is automatically controlled in accordance with the time signal output of said time control means during said duration thereof and (b) said diaphragm aperture setting is preselected and supplied to said time control means, the shutter speed is automatically controlled in accordance with the time signal output of said time control means during said duration thereof whereby the same duration of said time signal output of said time control means which is utilized for automatic control of said diaphragm aperture is also used for automatic control of said shutter speed depending upon the position of said selector switching means and whereby said time control means includes time signal conversion means for compressing or expanding the duration of said time signal output of said time control means, said signal conversion means operating only when the shutter speed setting is preselected, whereby said diaphragm aperture control means is automatically controlled in response to said converted time signal output.

5. In a photographic camera with automatic exposure control wherein either the shutter speed setting or the diaphragm aperture setting is preselected and the other is automatically controlled thereafter in relation to the preselected setting the improved camera comprising:

time control means which performs arithmetical operations on the indices of exposure control parameters such as scene brightness, film speed, shutter speed and diaphragm aperture and produces first and second control signals, the durations of which are functions of said arithmetic operations;

a shutter release means;

shutter speed setting means for presetting a desired shutter speed;

diaphragm aperture setting means for presenting a desired diaphragm aperture;

first switching means actuable to at least two different positions which permits the shutter speed preset by said shutter speed setting means or the diaphragm aperture preset by said diaphragm aperture setting means to be selectively supplied to said time control means so that when (a) said shutter speed setting is supplied to said time control means, the duration of the first control signal is a function at least of said shutter speed setting to the exclusion of said diaphragm aperture setting and (b) said diaphragm aperture setting is supplied to said time control means, the duration of said second control signal is a function of at least said diaphragm aperture setting to the exclusion of said shutter speed setting;

shutter control means including a shutter control coil responsive to said time control means for automatically controlling the shutter speed in accordance with the duration of said second control signal;

diaphragm aperture control means including an aperture control coil responsive to said time control means for automatically controlling the diaphragm aperture in accordance with the duration of said second control signal; and selector switching means responsive to said first switching means and actuable to at least two different positions which permits said shutter control coil or said aperture control coil to be selectively connected to said time control means so that when (a) said shutter speed setting is preselected and supplied to said time control means, the diaphragm aperture is automatically controlled in accordance with the duration of said first control signal and (b) said diaphragm aperture setting is preselected and supplied to said time control means, the shutter speed is automatically controlled in accordance with the duration of said second control signal whereby said first and second control signals are initiated at substantially the same time after actuation of the shutter release means.

6. The photographic camera with automatic exposure control according to claim 1, wherein said time control means includes time signal conversion means for compressing or expanding the duration of said first control signal, said signal conversion means operating only when the shutter speed setting is preselected, whereby said diaphragm aperture control means is automatically controlled in response to said converted first control signal.

7. In a camera as in claim 1 where said time control means includes a capacitor and threshold means, the duration of said first and second control signals each being a function of the time required for said capacitor to charge to the threshold level of said threshold means.

8. In a camera as in claim 7 where said shutter speed setting means and said diaphragm setting means respectively comprise variable resistors, one of the variable resistors being in circuit with said capacitor depending on the position of said first switching means.

9. In a camera as in claim 1 where said time control means includes a light sensitive device responsive to said scene brightness where said duration of each said first and second signals is a function of the output of said light sensitive device.

* * * * *